(12) United States Patent
Oouchida et al.

(10) Patent No.: US 9,079,576 B2
(45) Date of Patent: Jul. 14, 2015

(54) DRIVE SYSTEM CONTROL DEVICE FOR WORKING VEHICLE

(75) Inventors: Takeshi Oouchida, Osaka (JP); Keiichirou Yuzaki, Osaka (JP); Takashi Miyamoto, Osaka (JP); Tadao Hirai, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 153 days.

(21) Appl. No.: 13/821,420

(22) PCT Filed: Sep. 7, 2011

(86) PCT No.: PCT/JP2011/070363
§ 371 (c)(1),
(2), (4) Date: Mar. 7, 2013

(87) PCT Pub. No.: WO2012/036041
PCT Pub. Date: Mar. 22, 2012

(65) Prior Publication Data
US 2013/0166163 A1    Jun. 27, 2013

(30) Foreign Application Priority Data
Sep. 16, 2010    (JP) ................. 2010-208391

(51) Int. Cl.
| | | |
|---|---|---|
| *B60W 10/06* | (2006.01) |
| *B60W 10/101* | (2012.01) |
| *B60W 10/103* | (2012.01) |
| *B60W 10/30* | (2006.01) |
| *F02D 29/00* | (2006.01) |
| *F02D 41/02* | (2006.01) |
| *F01N 3/035* | (2006.01) |
| *F01N 3/10* | (2006.01) |
| *F16H 61/00* | (2006.01) |
| *F16H 61/02* | (2006.01) |

(52) U.S. Cl.
CPC ............ *B60W 10/06* (2013.01); *B60W 10/101* (2013.01); *B60W 10/103* (2013.01); *B60W 10/30* (2013.01); *F02D 29/00* (2013.01); *F02D 41/029* (2013.01); *B60Y 2200/221* (2013.01); *B60Y 2300/476* (2013.01); *F01N 3/035* (2013.01); *F01N 3/106* (2013.01); *F02D 2041/026* (2013.01); *F16H 2061/0018* (2013.01); *F16H 2061/0232* (2013.01)

(58) Field of Classification Search
None
See application file for complete search history.

(56) References Cited

U.S. PATENT DOCUMENTS 5,611,748 A * 3/1997 Kashiwabara ................. 477/47
6,119,552 A * 9/2000 Matsufuji ................. 74/606 R

FOREIGN PATENT DOCUMENTS

| JP | 2000-145430 | 5/2000 |
| JP | 2002-266678 | 9/2002 |

(Continued)

*Primary Examiner* — Mussa A Shaawat
(74) *Attorney, Agent, or Firm* — Jordan and Hamburg LLP

(57) ABSTRACT

In a working vehicle provided with an engine which is mounted to a travel machine body, a common rail type fuel injection device which injects fuel to the engine, a continuously variable transmission which shifts power from the engine, and the exhaust gas purification device which is arranged in an exhaust system of the engine, in the case that an engine operating point Q relating to a rotating speed N and a torque T of the engine is in a low-speed and low-torque side incapable of self-renewing the exhaust gas purification device, the engine operating point Q is changed to a high-speed and low-torque side capable of self-renewing the exhaust gas purification device, and a change gear ratio of the continuously variable transmission is changed and regulated in such a manner that a vehicle speed V of the travel machine body is not changed.

1 Claim, 12 Drawing Sheets

(56) References Cited

FOREIGN PATENT DOCUMENTS

| JP | 2003-027922 | | 1/2003 |
|---|---|---|---|
| JP | 2007-218196 | | 8/2007 |
| JP | 2007218196 | * | 8/2007 |
| JP | 2008-223739 | | 9/2008 |
| JP | 2008223739 | * | 9/2008 |
| JP | 2009-196393 | | 9/2009 |
| JP | 2009196393 | * | 9/2009 |

* cited by examiner

DRIVE SYSTEM CONTROL DEVICE FOR WORKING VEHICLE

TECHNICAL FIELD

The present invention relates to a drive system (engine and continuously variable transmission) control device for a working vehicle, for example, an agricultural machine and a construction machine.

BACKGROUND OF THE INVENTION

In recent years, in connection with application of a high-order emission control relating to a diesel engine (hereinafter, refer simply to as an engine), it has been desired to mount an exhaust gas purification device removing air polluting substances in an exhaust gas to an agricultural machine and a construction machine having an engine mounted thereon. As the exhaust gas purification device, there has been known a diesel particulate filter (hereinafter, refer to as DPF) (refer to patent documents 1 and 2).

The DPF is structured such as to collect a particulate matter (hereinafter, refer to as PM) in the exhaust gas, and can recover its own PM collecting capacity (can self-renew) by burning and removing the PM, if a temperature of the exhaust gas is, for example, equal to or higher than 300° C. However, if a drive state of the engine is under low speed and low torque, and the temperature of the exhaust gas is lower, the PM is neither burned nor removed, but is deposited in the DPF (cannot be self-renewed). If a deposition amount of PM in the DPF exceeds a prescribed amount, a flow resistance in the DPF is increased and a reduction of an engine output is caused. Accordingly, a forced renewal of DPF has been often carried out by forcedly raising an output horsepower of the engine so as to raise the temperature of the exhaust gas.

CITATION LIST

Patent Literature

Patent Document 1: Japanese Patent Application Laid-open No. 2000-145431)
Patent Document 2: Japanese Patent Application Laid-open No. 2003-27922

SUMMARY OF INVENTION

A working vehicle such as a tractor or the like having the engine and the DPF thereon is structured such as to carry out a seeding work, a fertilizer application work or a harvesting work, while towing a ground working machine such as a seeding machine, a fertilizer distributor or a harvesting machine. In the case of carrying out these various works, the working vehicle may travel in a farm field at a comparatively low speed (for example, at a creep speed). When the working vehicle travels at the low speed, a drive state of the engine is under the low speed and low torque, and the temperature of the exhaust gas is low. Therefore, since a condition that the PM is deposited in the DPF continues during the various works while traveling at the low speed, the DPF tends to be clogged. If the condition is left as it is, a problem of an exhaust gas pressure rising caused by the clogging is generated. When the DPF is forcedly renewed during the various works while traveling at the low speed, conventionally, an output torque of the engine has been increased, or a rotating speed of the engine has been conventionally increased. However, in the former case, means for forcedly increasing the output torque is independently required, thereby causing a problem that the number of the parts increases. Further, in the latter case, a vehicle speed may be increased.

Accordingly, a technical object of the present invention is to provide a drive system control device of a working vehicle which dissolves the problem mentioned above.

A drive system control device according to a first aspect of the present invention is structured such that in a working vehicle provided with an engine which is mounted to a travel machine body, a common rail type fuel injection device which injects fuel to the engine, a continuously variable transmission which shifts power from the engine, and an exhaust gas purification device which is arranged in an exhaust system of the engine, in the case that an engine operating point relating to a rotating speed and a torque of the engine is in a low-speed and low-torque side incapable of self-renewing the exhaust gas purification device, the engine operating point is changed to a high-speed and low-torque side capable of self-renewing the exhaust gas purification device, and a change gear ratio of the continuously variable transmission is changed and regulated in such a manner that a vehicle speed of the travel machine body is not changed.

The invention of a second aspect is structured such that in the drive system control device of the working vehicle described in the first aspect, at the engine operating point in the high-speed and low-torque side, the self-renewal of the exhaust gas purification is allowed under a condition that an output horsepower is equal to that at the engine operating point in the low-speed and low-torque side.

The invention of a third aspect is structured such that in the drive system control device of the working vehicle described in the second aspect, a renewing device for burning and removing a particulate matter in the exhaust gas purification device is provided, and in the case that the engine operating point is in the low-speed and low-torque side incapable of self-renewing the exhaust gas purification device, the renewing device is actuated when the output horsepower is equal to that at the engine operating point in the low-speed and low-torque side, and the engine operating point in the high-speed and low-torque side capable of self-renewing the exhaust gas purification device does not exist.

According to the drive system control device of the first aspect of the present invention, in the working vehicle provided with the engine which is mounted to the travel machine body, the common rail type fuel injection device which injects the fuel to the engine, the continuously variable transmission which shifts the power from the engine, and the exhaust gas purification device which is arranged in the exhaust system of the engine, since in the case that the engine operating point relating to the rotating speed and the torque of the engine is in the low-speed and low-torque side incapable of self-renewing the exhaust gas purification device, the engine operating point is changed to the high-speed and low-torque side capable of self-renewing the exhaust gas purification device, and the change gear ratio of the continuously variable transmission is changed and regulated in such a manner that the vehicle speed of the travel machine body is not changed, it is possible to clear a clogging of the exhaust gas purification device without executing a forced renewal of the exhaust gas purification device while maintaining a vehicle speed, for example, under various works while traveling at a low speed. Therefore, it is possible to achieve an effect of improving a workability in the working vehicle.

According to the invention of the second aspect, since at the engine operating point in the high-speed and low-torque side, the self-renewal of the exhaust gas purification is allowed under the condition that the output horsepower is equal to that at the engine operating point in the low-speed and low-torque side, the output horsepower of the engine is used as a reference for changing the engine operating point. Therefore, it is possible to achieve an effect of easily and accurately maintaining the vehicle speed of the working vehicle.

According to the invention of the third aspect, since the renewing device for burning and removing the particulate matter in the exhaust gas purification device is provided, and in the case that the engine operating point is in the low-speed and low-torque side incapable of self-renewing the exhaust gas purification device, the renewing device is actuated when the output horsepower is equal to that at the engine operating point in the low-speed and low-torque side, and the engine operating point in the high-speed and low-torque side capable of self-renewing the exhaust gas purification device does not exist, the exhaust gas purification device can be renewed by directly regulating the output horsepower of the engine or actuating the renewing device depending on a situation. Therefore, it is possible to reduce an operating frequency or shorten an operating time of the renewing device, thereby achieving an efficient renewal of the exhaust gas purification device, and it is possible to achieve an effect of contributing to suppression of deterioration of fuel consumption.

DESCRIPTION OF THE PREFERRED EMBODIMENTS

A description will be given below of an embodiment which embodies the present invention on the basis of the accompanying drawings.

(1) Outline Structure of Tractor

Figure 1:
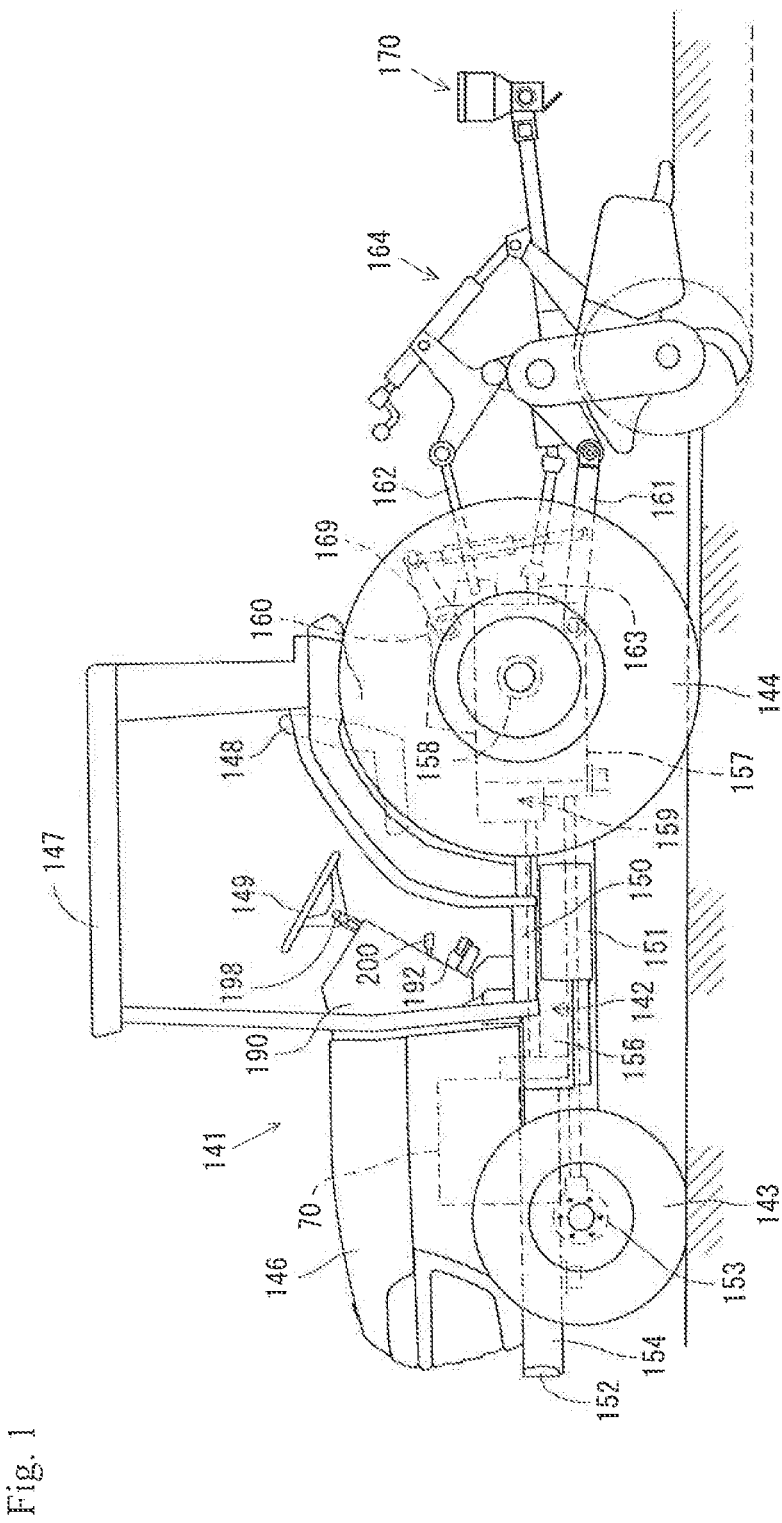
FIG. 1 is a side elevational view of a tractor serving as a working vehicle.
Figure 2:
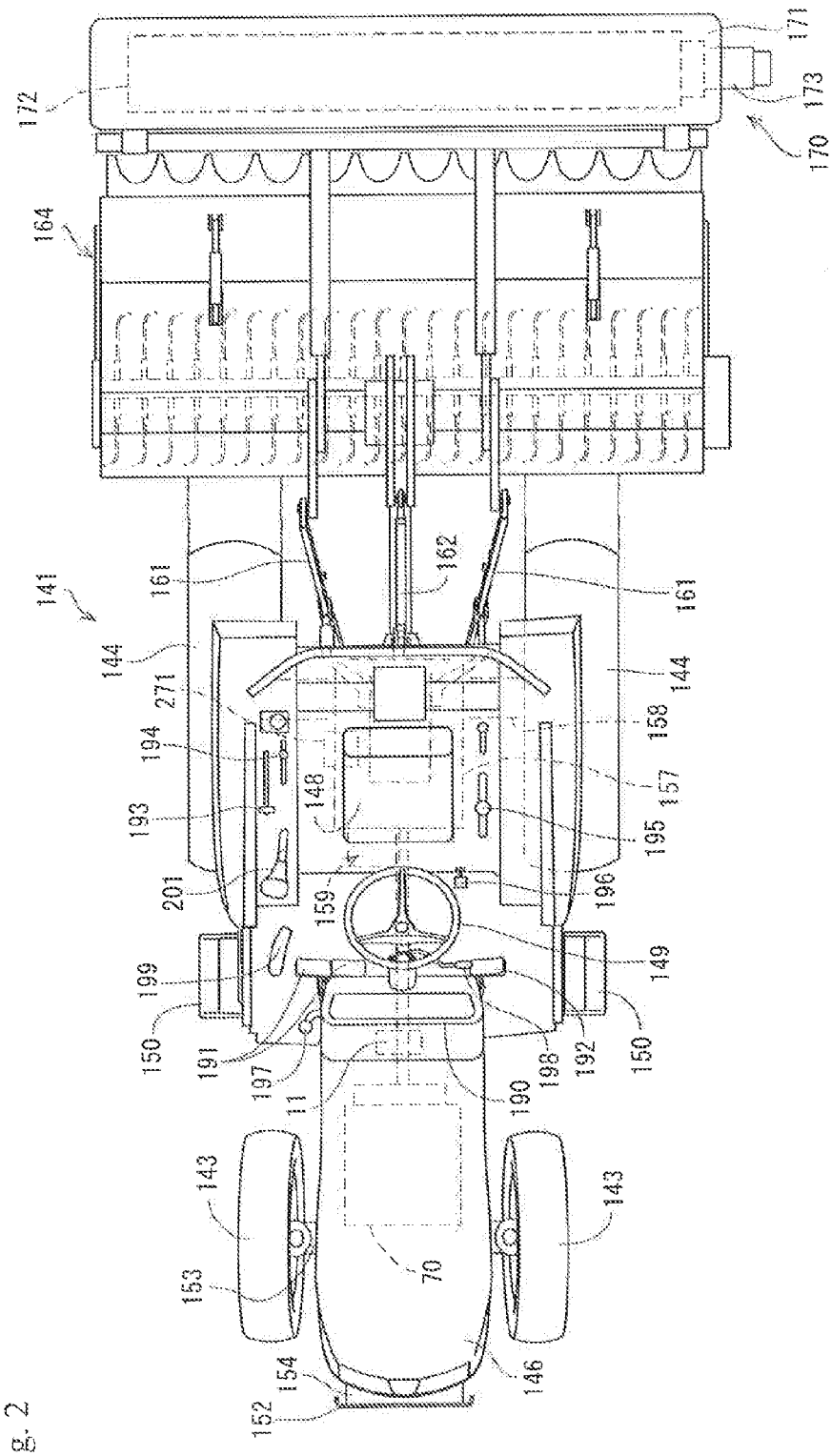
FIG. 2 is a plan view of the tractor.

First of all, a description will be given of an outline structure of a tractor 141 corresponding to one example of a working vehicle with reference to FIGS. 1 and 2. As shown in FIGS. 1 and 2, a travel machine body 142 of the tractor 141 is supported by a pair of right and left front wheels 143 and a pair of right and left rear wheels 144. The tractor 141 is structured such as to travel forward and backward by driving the rear wheels 144 and the front wheels 143 by an engine 70 which is mounted to a front portion of the travel machine body 142. The engine 70 is covered with a hood 146. Further, a cabin 147 is installed, to an upper surface of the travel machine body 142. A control seat 148 and a control steering wheel 149 moving a steering direction of the front wheels 143 right and left by a steering operation are installed to an inner portion of the cabin 147. A step 150 which an operator gets on and off is provided in an outer side portion of the cabin 147, and a fuel tank 151 for supplying fuel to the engine 70 is provided in an inner side of the step 150 and a lower side than a bottom portion of the cabin 147.

As shown in FIGS. 1 and 2, the control steering wheel 149 within the cabin 147 is provided on a control column 190 which is positioned in front of the control seat 148. A right side of the control column 190 is provided with a throttle lever 197 which sets and keeps a rotating speed of the engine 70, and a pair of right and left brake pedals 191 which operate the travel machine body 142 so as to brake. In a left side of the control column 190, there are arranged a forward and backward movement switching lever 198 for operating so as to switch a moving direction of the travel machine body 142 to a forward movement and a backward movement, and a clutch pedal 192. A back surface side of the control column 190 is provided with a parking brake lever 200 which keeps the brake pedal 191 at a depressed position.

In a right side of the brake pedal 191, there is arranged an accelerator pedal 199 which increases and decreases a rotating speed in a range from a lower limit rotating speed to a higher speed, the lower limit rotating speed being the rotating speed of the engine 70 set by the throttle lever 197. On a right column of the control seat 148, there are arranged a working machine elevating lever 193 which manually changes and regulates a height position of a rotary tiller 164 serving as a ground working machine, a PTO shift lever 194, and a main shift lever 201 for a shift operation. A sub transmission lever 195 is arranged on a left column of the control seat 148, and a differential lock pedal 196 is arranged in a front side of the left column.

As shown in FIGS. 1 and 2, the travel machine body 142 is constructed by an engine frame 154 having a front bumper 152 and a front axle case 153, and right and left machine body frames 156 which are detachably fixed to a rear portion of the engine frame 154 by bolts. A transmission case 157 for appropriately shifting a drive force of the engine 70 and transmitting to the rear wheels 144 and the front wheels 143 is connected to a rear portion of the machine body frame 156. The rear wheel 144 is attached via a rear axle case 158 which is installed so as to protrude outward from an outer side surface of the transmission case 157. A continuously variable transmission 159 (refer to FIGS. 3 and 4) shifting the drive force from the engine 70 is provided within the transmission case 157.

A hydraulic type working machine elevating mechanism 160 moving up and down the rotary tiller 164 is detachably mounted to an upper surface of a rear portion of the transmission case 157. The rotary tiller 164 is connected to the rear portion of the transmission case 157 via a three-point link mechanism constituted by a pair of right and left lower links 161 and a top link 162. The rear side surface of the transmission case 157 is provided with a PTO shaft 163 for transmitting a PTO drive force to the rotary tiller 184 so as to protrude rearward.

As shown in FIGS. 1 and 2, a seeding machine 170 for sowing is attached to the rear portion side of the rotary tiller 184 so as to be replaceable with as fertilizer distributor (not shown). The seeding machine 170 is provided with a tank 171 charging seeds, a feeding portion 172 feeding the seeds within the tank 171 at a fixed amount, and an electric motor 173 driving a feeding roller (not shown) of the feeding portion 172. The seeds within the tank 171 are scattered onto the already tilled ground at the back of the rotary tiller 164 from the feeding portion 172. In the case that the fertilizer distributor is attached to the rotary tiller 164, the fertilizer (medical agent) of the fertilizer distributor is scattered onto the already tilled ground at the back of the rotary tiller 164.

(2) Hydraulic Circuit Structure of Tractor

Figure 3:
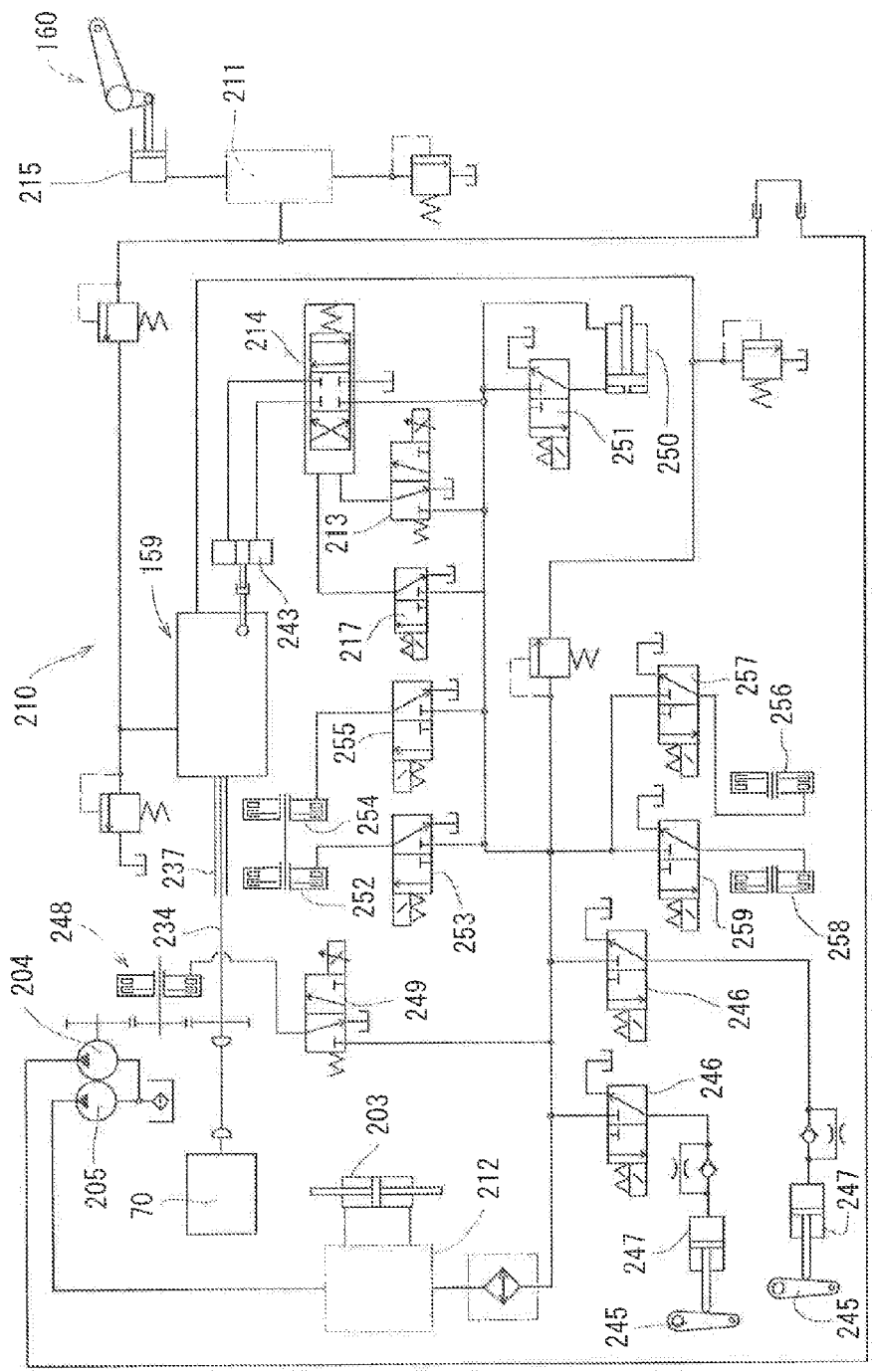
FIG. 3 is a hydraulic circuit diagram of the tractor.
Figure 4:
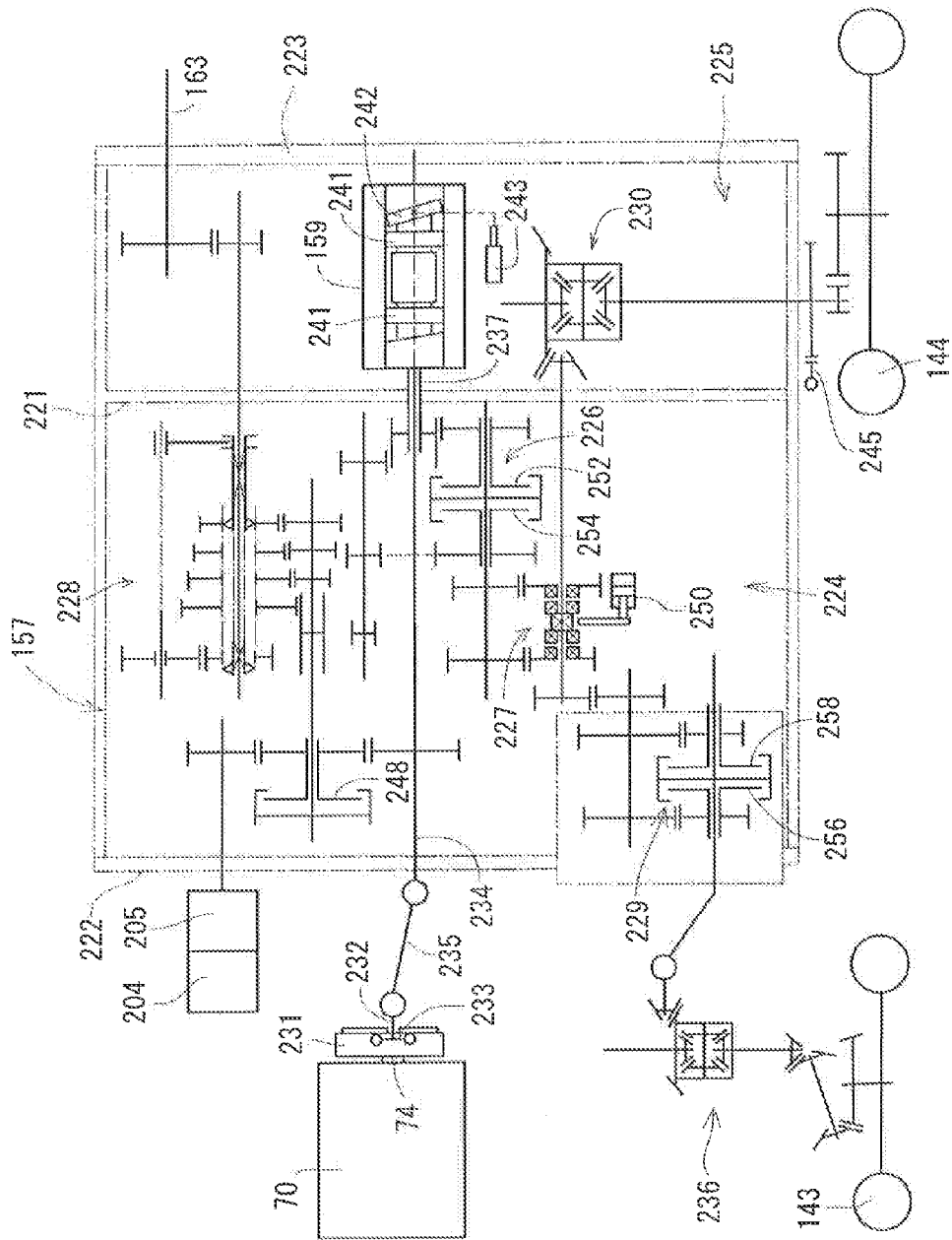
FIG. 4 is a skeleton view of a power transmission system of the tractor.

Next, a description will be given of a structure of a hydraulic circuit 210 of the tractor 141 mainly with reference to FIG. 3. The hydraulic circuit 210 of the tractor 141 is provided with a working hydraulic pump 204 and a traveling hydraulic pump 205 which are driven by a rotary power of the engine 70. The working hydraulic pump 204 and the traveling hydraulic pump 205 are provided in a front surface side of a front side wall member 222 in the transmission case 157 (refer to FIG. 4). The working hydraulic pump 204 is connected to a control electromagnetic valve 211 for supplying a working fluid to an elevation control hydraulic cylinder 215 of the working machine elevating mechanism 160. The control electromagnetic valve 211 is structured such as to be operable in a switching manner on the basis of an operation of the working machine elevating lever 193. When the control electromagnetic valve 211 is operated so as to be switched by the working machine elevating lever 193, the elevation control hydraulic cylinder 215 is driven so as to expand and contract, and elevates and turns a lift arm 169 (refer to FIG. 1) connecting the working machine elevating mechanism 160 and the right and left lower links 161. As a result, the rotary tiller 164 is moved up and down via the lower links 161.

The traveling hydraulic pump 205 is structured such as to supply the working fluid to the continuously variable transmission 159 of the transmission case 157 and a hydraulic cylinder 203 for a power steering. In this case, the transmission case 157 is also utilized as a working fluid tank, and the working fluid in an inner portion of the transmission case 157 is supplied to each of the hydraulic pumps 204 and 205. The traveling hydraulic pump 205 is connected to the hydraulic cylinder 203 for the power steering via a control valve 212 for the power steering, and is connected to an automatic brake electromagnetic valve 246 in relation to a brake cylinder 247 for a pair of right and left brake actuating mechanisms 245.

Further, the traveling hydraulic pump 205 is connected to a PTO clutch hydraulic electromagnetic valve 249 actuating a PTO clutch 248 of a PTO shift mechanism 228, a proportional control valve 213 and a starting electromagnetic valve 217 in relation to the continuously variable transmission 159, a switch valve 214 actuated by the valves 213 and 217, a high speed clutch electromagnetic valve 251 actuating a sub shift hydraulic cylinder 250 of a sub shift mechanism 227, a forward moving clutch electromagnetic valve 253 in relation to a forward moving hydraulic clutch 252 of a forward and backward movement switching mechanism 226, a backward moving clutch electromagnetic valve 255 in relation to a backward moving hydraulic clutch 254, a 4-wheel drive hydraulic electromagnetic valve 257 in relation to a 4-wheel drive hydraulic clutch 256 of a 2-wheel drive and 4-wheel drive switching mechanism 229, and a double speed hydraulic electromagnetic valve 259 in relation to a double speed hydraulic clutch 258.

The PTO clutch hydraulic electromagnetic valve 249, the forward moving clutch electromagnetic valve 253, the backward moving clutch electromagnetic valve 255, the 4-wheel drive hydraulic electromagnetic valve 257, and the double speed hydraulic electromagnetic valve 259 are structured such as to switch and drive the respective hydraulic clutches 248, 252, 254, 256 and 258 by actuating the respective corresponding clutch cylinders on the basis of an appropriate control thereof. In this case, the hydraulic circuit 210 is provided with a relief valve, a flow rate regulating valve, a check valve, an oil cooler, an oil filter and the like, (3) Power Transmission System of Tractor Next, a description will be given of a power transmission system of the tractor 141 mainly with reference to FIG. 4. A front side wall member 222 is detachably fixed to a front surface of the transmission case 157 which is formed as a hollow box shape, and a rear side wall member 223 is detachably fixed to a rear surface of the transmission case 157. An inner portion of the transmission case 157 is separated into a front chamber 224 and a rear chamber 225 by a partition wall 221. Although an illustration is omitted, the front chamber 224 and the rear chamber 225 are communicated in such a manner that the internal working fluids are movable each other. In the front chamber 224 side of the transmission case 157, there are arranged a forward and backward movement switching mechanism 226 switching a rotary power from the continuously variable transmission 159 to a forward turning direction and a reverse turning direction, a mechanical sub shift mechanism 227 shifting the rotary power via the forward and backward movement switching mechanism 226, a PTO shift mechanism 228 transmitting the rotary power from the engine 70 to the PTO shaft 163 while appropriately shifting, and a 2-wheel drive and 4-wheel drive switching mechanism 229 switching the 2-wheel drive and the 4-wheel drive of the front and rear wheels 143 and 144. Further, the continuously variable transmission 159, and a differential gear mechanism 230 transmitting the rotary power via the sub shift mechanism 227 to the right and left rear wheels 144 are arranged in the rear chamber 225 side of the transmission case 157.

A flywheel 231 is attached in a direct connecting manner to an engine output shaft 74 protruding rearward from the engine 70. The flywheel 231 and a main driving shaft 232 extending rearward from the flywheel are connected via a main clutch 233 for connecting and disconnecting the power. The main driving shaft 232 and a main shift input shaft 234 protruding forward from the transmission case 157 are connected via a power transmission shaft 235 provided with universal shaft joints in both ends. The rotary power of the engine 70 is transmitted to the main shift input shaft 234 from the engine output shaft 74 via the main driving shaft 232 and the power transmission shaft 235, and is next shifted appropriately by the continuously variable transmission 159 and the sub shift mechanism 227. The shift power is transmitted to the right and left rear wheels 144 via the differential gear mechanism 230. The shift power by the continuously variable transmission 159 and the sub shift mechanism 227 is also transmitted to the right and left front wheels 153 via the 2-wheel drive and 4-wheel drive switching mechanism 229 and a differential gear mechanism 236 within the front axle case 143.

The continuously variable transmission 159 in an inner portion of the rear chamber 225 is of an inline type that a main shift output shaft 237 is concentrically arranged in the main shift input shaft 234, and is provided with a variable displacement type hydraulic pump portion 240, and a constant displacement type shifting hydraulic motor portion 241 actuated by the high-pressure working fluid discharged from the hydraulic pump portion 240. The hydraulic pump portion 240 is provided with a pump awash plate 242 regulating a working fluid supply amount by variably changing an angle of incline in relation to an axis of the main shift input shaft 234. A main shift hydraulic cylinder 243 changing and regulating the angle of incline of the pump awash plate 242 in relation to the axis of the main shift input shaft 234 is associated with the pump awash plate 242. An amount of the working fluid supplied to the hydraulic motor portion 241 from the hydraulic pump portion 240 is changed and regulated by changing the angle of incline of the pump smash plate 242 on the basis of a driving motion of the main shift hydraulic cylinder 243, and a main shifting motion of the continuously variable transmission 159 is carried out.

Figure 5:
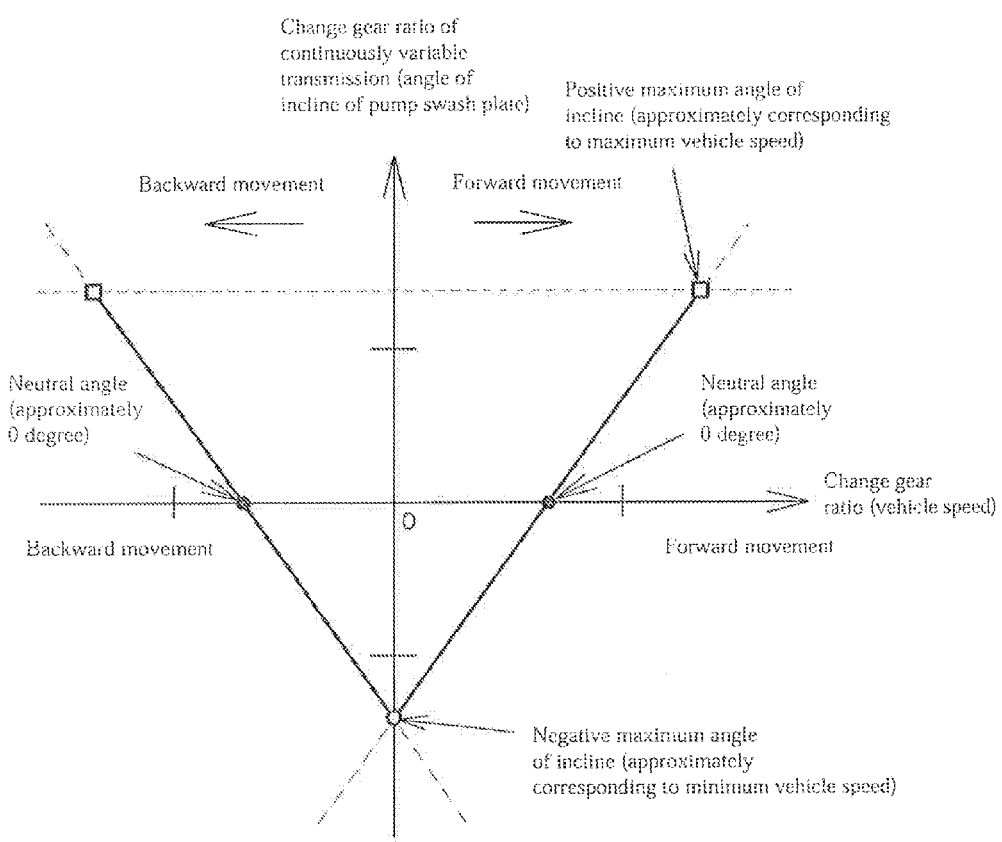
FIG. 5 is a view describing a relationship between a vehicle speed and a change gear ratio of a continuously variable transmission.

Namely, if the switch valve 214 is actuated by the working fluid from the proportional control valve 213 which is actuated in proportion to an amount of operation of the main shift lever 201, the main shift hydraulic cylinder 190 is driven, and the angle of incline of the pump smash plate 242 in relation to the axis of the main shift input shaft 234 is changed in conjunction with this. The pump awash plate 242 of the embodiment can be regulates its angle in a range between one (positive) maximum angle of incline and the other (negative) maximum angle of incline with respect to a neutral angle which is approximately zero in incline (in the vicinity of zero including zero), and is set to an angle inclined to any one (negative and nearly maximum angle of incline in this case) when the vehicle speed of the travel machine body 142 is the lowest (refer to FIG. 5).

When the angle of incline of the pump swash plate 242 is approximately zero (neutral angle), the hydraulic motor portion 241 is not driven by the hydraulic pump portion 240, and the main shift output shaft 237 turns at to rotating speed which is approximately the same as that of the main shift input shaft 234. When the pump swash plate 242 is inclined to one direction (positive angle of incline) in relation to the axis of the main shift input shaft 234, the hydraulic pump portion 240 actuates at increased speed the hydraulic motor portion 241, and the main shift output shaft 237 turns at a rotating speed which is higher than that of the main shift input shaft 234. As a result, the rotating speed of the hydraulic motor portion 241 is added to the rotating speed of the main shift input shaft 234, and the added rotating speed is transmitted to the main shift output shaft 237. Accordingly, the shift power (vehicle speed) from the main shift output shaft 237 is changed in proportion to the angle of incline (positive angle of incline) of the pump swash plate 242 in the range of the rotating speed which is higher than the rotating speed of the main shift input shaft 234. When the pump swash plate 242 is at the positive angle of incline and is in the vicinity of the maximum angle, the travel machine body 142 comes to the maximum vehicle speed (refer to outline square positions in FIG. 5).

When the pump swash plate 242 is inclined to the other direction (negative angle of incline) side in relation to the axis of the main shift input shaft 234, the hydraulic pump portion 240 actuates the hydraulic motor portion 241 so as to decelerate (reversely turn), and the main shift output shaft 237 turns at a rotating speed which is lower than that of the main shift input shaft 234. As a result, the rotating speed of the hydraulic motor portion 241 is subtracted from the rotating speed of the main shift input shaft 234, and the subtracted rotating speed is transmitted to the main shift output shaft 237. Accordingly, the shift power from the main shift output shaft 237 is changed in proportion to the angle of incline (negative angle of incline) of the pump swash plate 242 in the range of the rotating speed which is lower than the rotating speed of the main shift input shaft 234. When the pump swash plate 242 is at the negative angle of incline and is in the vicinity of the maximum angle, the travel machine body 142 comes to the minimum vehicle speed (refer to an outline circle position in FIG. 5).

In this case, in the embodiment, if the switch valve 214 is actuated by the working fluid from the starting electromagnetic valve 217 which is actuated on the basis of a command of a working machine (shift) controller 271 mentioned later, the main shift hydraulic cylinder 243 is driven regardless of an operated position of the main shift lever 201, and the angle of incline of the pump swash plate 242 in relation to the axis of the main shift input shaft 234 is changed in conjunction with this.

(4) Engine and Peripheral Structure

Figure 6:
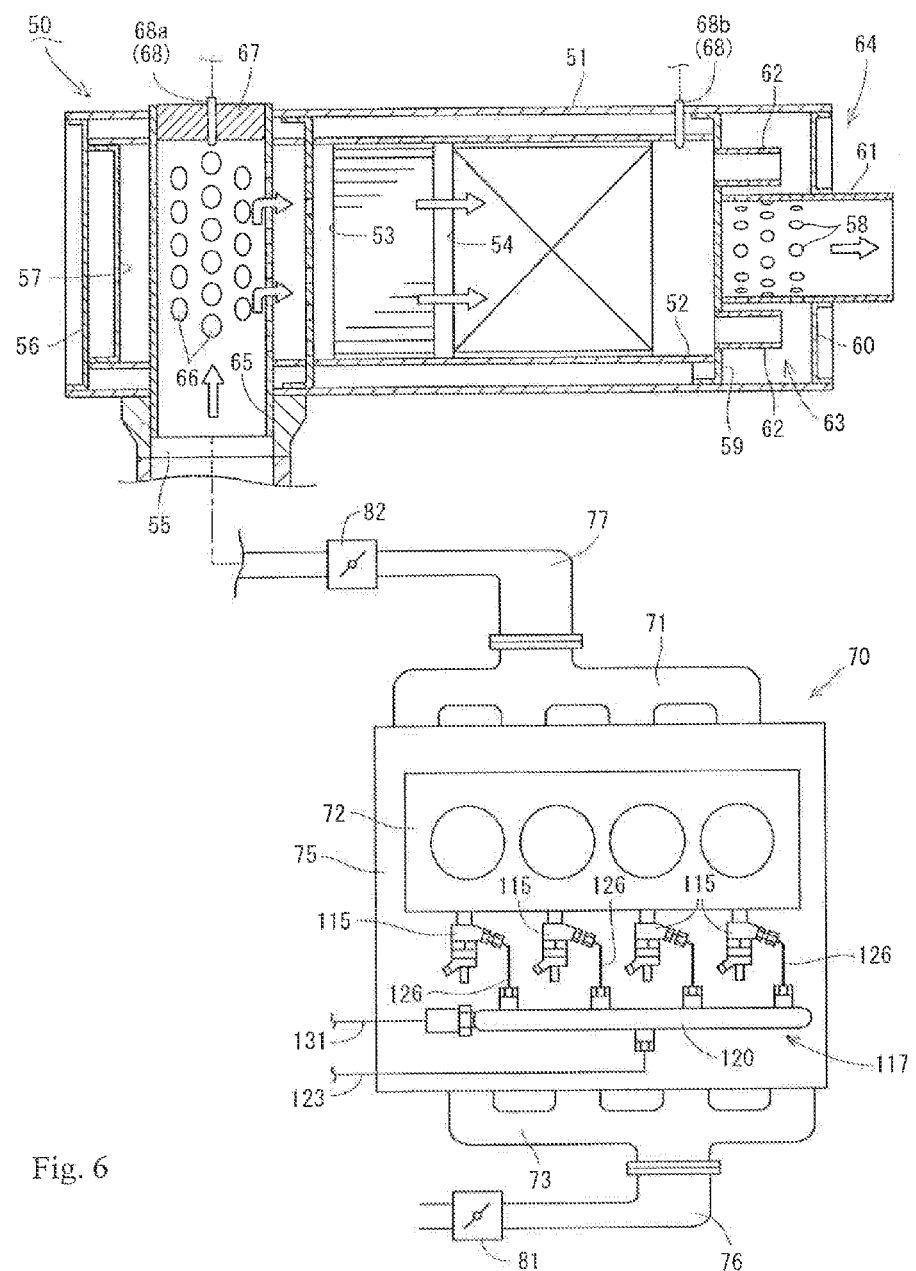
FIG. 6 is an explanatory view of a fuel system of an engine.

Next, a description will be given of the engine 70 and its peripheral structure with reference to FIGS. 6 and 7. As shown in FIG. 6, the engine 70 is a four-cylinder type diesel engine, and is provided with a cylinder block 75 to which a cylinder head 72 is fastened to an upper surface. An intake manifold 73 is connected to one side surface of the cylinder head 72, and an exhaust manifold 71 is connected to the other side surface. A common rail device 117 supplying the fuel to each of the cylinders of the engine 70 is provided below the intake manifold 73 in a side surface of the cylinder block 75. An intake air throttle device 81 for regulating a pressure of an intake air (an amount of the intake air) of the engine 70 and an air cleaner (not shown) are connected to an intake pipe 76 connected to an upstream side of the intake air of the intake manifold 73.

Figure 7:
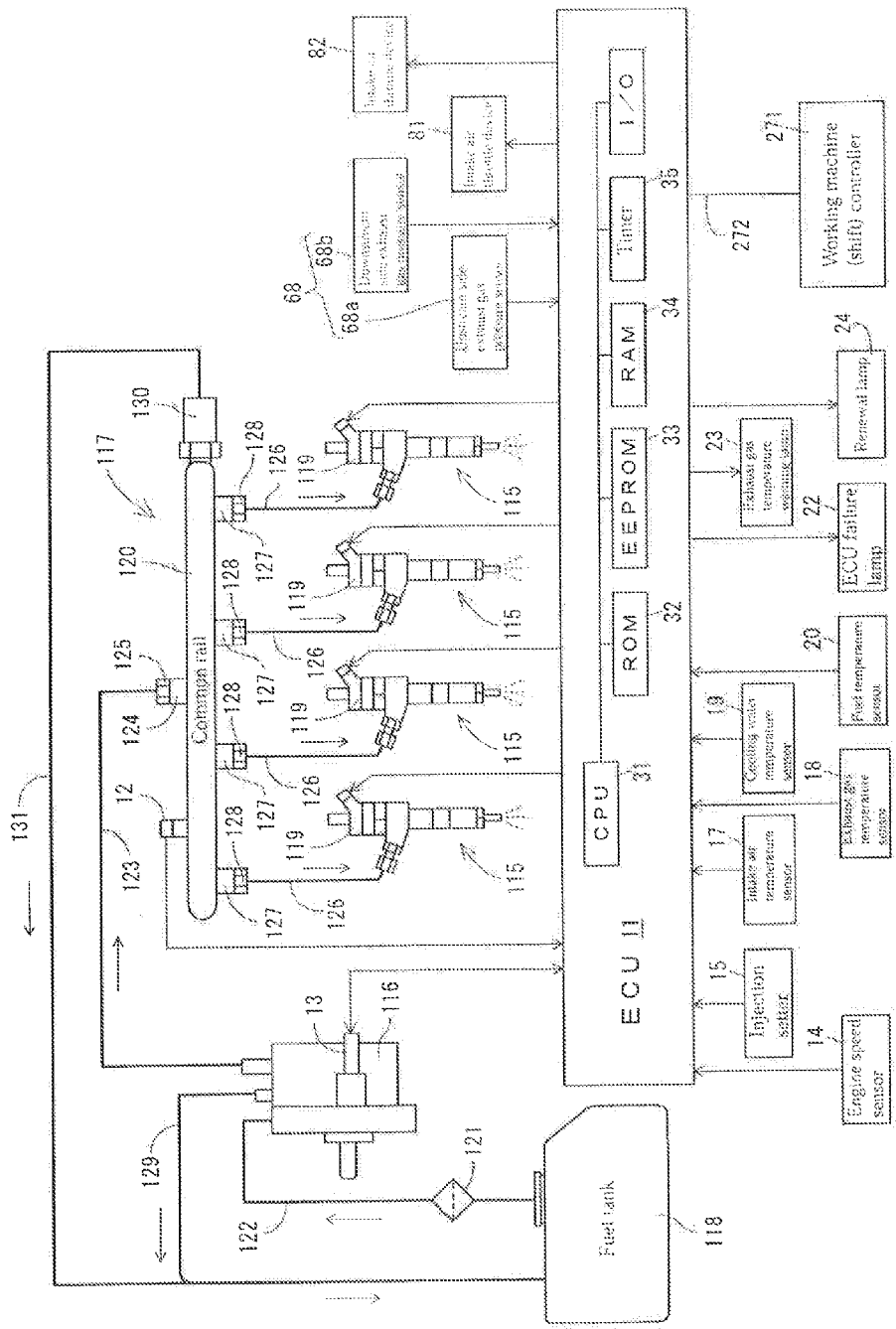
FIG. 7 is a function block diagram showing a relationship between the engine and an exhaust gas purification device.

As shown in FIG. 7, a fuel tank 118 is connected to each of injectors 115 for four cylinders in the engine 70 via the common rail device 117 and the fuel supply pump 116. Each of the injectors 115 is provided with a fuel injection valve 119 of an electromagnetically open and close control type. The common rail device 117 is provided with a cylindrical common rail 120. The fuel tank 118 is connected to a suction side of the fuel supply pump 116 via a fuel filter 121 and a low pressure pipe 122. The fuel within the fuel tank 118 is sucked into the fuel supply pump 116 via the fuel filter 121 and the low pressure pipe 122. The fuel supply pump 116 of the embodiment is arranged in the vicinity of the intake manifold 73. The common rail 120 is connected to a discharge side of the fuel supply pump 116 via a high pressure pipe 123. The injectors 115 for four cylinders are connected to the common rail 120 via four fuel injection pipes 126.

In the structure mentioned above, the fuel in the fuel tank 118 is pressure fed to the common rail 120 by the fuel supply pump 116, and the fuel having the high pressure is stored in the common rail 120. The high-pressure fuel within the common rail 120 is injected to each of the cylinders of the engine 70 from each of the injectors 115 on the basis of an opening and closing control of each of the fuel injection valves 119. Namely, an injection pressure, an injection timing, and an injecting period (an injection amount) of the fuel supplied from each of the injectors 115 are controlled with a high precision by electronically controlling each of the fuel injection valves 119. Accordingly, it is possible to reduce a nitrogen oxide (NOx) from the engine 70 and it is possible to reduce a noise and an oscillation of the engine 70.

Figure 9:
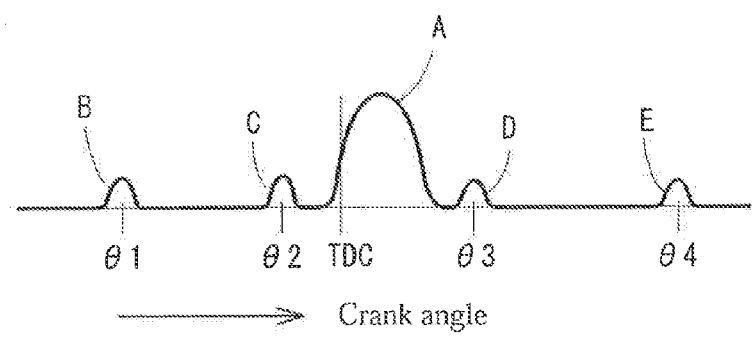
FIG. 9 is a view describing an injection timing of fuel.

As shown in FIG. 9, the common rail device 117 is structured such as to execute a main injection A in the vicinity of a top dead center (TDC). Further, the common rail device 117 is structured such as to execute a small amount of pilot injection B for the purpose of reducing NOx and the noise at a moment of a crank angle $\theta 1$ which is about 60 degree before the top dead center, execute a previous injection C for the purpose of reducing the noise at a moment of a crank angle $\theta 2$ which is just before the top dead center, and execute an after injection D and a post injection E for the purpose of reducing a PM and promoting purification of the exhaust gas at a moment of crank angles $\theta 3$ and $\theta 4$ which are after the top dead center, in addition to the main injection A.

The pilot injection B is structured such as to promote mixing between the fuel and the air by injecting at a moment which is greatly advanced in relation to the main injection A. The previous injection C is structured such as to shorten a delay of an ignition timing by the main injection A by injecting prior to the main injection A. The after injection D is structured such as to activate a diffusion combustion and afterburn the PM (reduce the PM) by injecting at a moment which is close to the main injection A. The post injection E is structured such as to supply the unburned fuel which does not contribute to an actual combustion process to a DPF 50 mentioned later, by injecting at a moment which is greatly retarded in relation to the main injection A. The unburned fuel supplied to the DPF 50 reacts on a diesel oxidation catalyst 53 mentioned below, and a temperature of the exhaust gas within the DPF 50 rises by a reaction heat. A height of peaks of a graph in FIG. 9 expresses roughly a difference of the fuel injection amount in each of the injecting stages A to E.

In this case, as shown in FIG. 7, the fuel supply pump 116 is connected to the fuel tank 118 via a fuel return pipe 129. A common rail return pipe 131 is connected to an end portion in a longitudinal direction of the cylindrical common rail 120 via a return pipe connector 130 restricting a pressure of the fuel within the common rail 120. Namely, a surplus fuel of the fuel supply pump 116 and a surplus fuel of the common rail 120 are recovered by the fuel tank 118 via the fuel return pipe 129 and the common rail return pipe 131.

An exhaust gas throttle device 82 for regulating an exhaust gas pressure of the engine 70 and the DPF 50 corresponding to one example of the exhaust gas purification device are connected to an exhaust pipe 77 which is connected to a downstream side of the exhaust gas of the exhaust manifold 71. The exhaust gas discharged to the exhaust manifold 71 from each of the cylinders is discharged to an external portion after being applied a purifying process via the exhaust pipe 77, the exhaust gas throttle device 82, and the DPF 50.

As shown in FIG. 6, the DPF 50 is structured such as to collect the PM in the exhaust gas. The DPF 50 in the embodiment is structured, for example, such that a diesel oxidation catalyst 53 such as a platinum and a soot filter 54 are accommodated in serried in an approximately tubular filter case 52 within a casing 51 made of a heat resisting metal material. The diesel oxidation catalyst 53 is arranged in an upstream side of the exhaust gas of the filter case 52, and the soot filter 54 is arranged in a downstream side of the exhaust gas. The soot filter 54 is constructed as a honeycomb structure which is divided into a lot of cells by porous partition walls capable of filtering the exhaust gas.

One side portion of the casing 51 is provided with an exhaust gas introduction port 55 which is communicated with an exhaust gas downstream side of the exhaust gas throttle device 82 in the exhaust pipe 77. One side portion of the casing 51 and one side portion of the filter case 52 are occluded by a first side wall plate 56 and a second side wall plate 57. The other side portion of the casing 51 is occluded by a first lid plate 59 and a second lid plate 60. A portion between both the lid plates 59 and 60 is constructed as an exhaust gas sound damping chamber 63 which is communicated with the filter case 52 via a plurality of communication pipes 62. Further, an approximately tubular exhaust gas outlet pipe 61 passes through the second lid plate 60. A plurality of communication holes 58 which are open toward the exhaust gas sound damping chamber 63 are formed in an outer peripheral surface of the exhaust gas outlet pipe 61. A sound absorber 64 is constructed by the exhaust gas outlet pipe 61 and the exhaust gas sound damping chamber 63.

An exhaust gas introduction pipe is inserted into the exhaust gas introduction port 55 which is formed in one side portion of the casing 51. A leading end of the exhaust gas introduction pipe 65 cuts across the casing 51 so as to protrude to a side surface in an opposite side to the exhaust gas introduction port 55. A plurality of communication holes 66 which are open toward the filter case 52 are formed in an outer peripheral surface of the exhaust gas introduction pipe 65. A portion protruding to a side surface in an opposite side to the exhaust gas introduction port 55 in the exhaust gas introduction pipe 65 is occluded by a lid 67 which is detachably attached by screw thereto.

The DPF 50 is provided with a DPF differential pressure sensor 68 detecting a clogged state of the soot filter 54, as one example of detecting means. The DPF differential pressure sensor 68 is structured such as to detect a pressure difference (an exhaust gas differential pressure between an inlet side and an outlet side) of each of the exhaust pressures in the upstream side and the downstream side of the soot filter 54 within the DPF 50. In this case, an upstream side exhaust gas pressure sensor 68a constructing the DPF differential pressure sensor 68 is installed to the lid body 67 of the exhaust gas introduction pipe 65, and a downstream side exhaust gas pressure sensor 68b is installed between the soot filter 54 and the exhaust gas sound damping chamber 63.

In this case, since a specific relevance exists between the pressure difference of the upstream and downstream of the DPF 50, and a PM sedimentation amount within the soot filter 54 (the DPF 50), the PM sedimentation amount within the DPF 50 can be determined by computation on the basis of the pressure difference which is detected by the DPF differential pressure sensor 68. Further, a renewing control of the soot filter 54 (the DPF 50) is executed by actuating and controlling the intake air throttle device 81, the exhaust gas throttle device 82, or the common rail 120 on the basis of a computation result of the PM sedimentation amount.

In the structure mentioned above, the exhaust gas from the engine 70 enters into the exhaust gas introduction pipe 65 via the exhaust gas introduction port 55, jets out into the filter case 52 from each of the communication holes 66 formed the exhaust gas introduction pipe 65, and passes through the diesel oxidation catalyst 53 and the soot filter 54 in this order so as to be purified. The PM in the exhaust gas is collected by the soot filter 54 (the porous partition wall between the cells). The exhaust gas passing through the diesel oxidation catalyst 53 and the soot filter 54 is discharged out to the machine from the exhaust gas outlet pipe 61 via the sound absorber 64.

If the temperature of the exhaust gas is higher than a renewable temperature (for example, about 250 to 300° C.) when the exhaust gas passes through the diesel oxidation catalyst 53 and the soot filter 54, NO (nitrogen monoxide) in the exhaust gas is oxidized into an unstable $NO_2$ (nitrogen dioxide) by an action of the diesel oxidation catalyst 53. Further, a PM collecting capacity of the soot filter 54 is recovered by oxidizing and removing the PM deposited in the soot filter 54, by oxygen (O) which is discharged when the $NO_2$ returns to NO. That is, the soot filter 54 (DPF 50) is regenerated.

(5) Structure Relevant to Control of Engine

Figure 8:
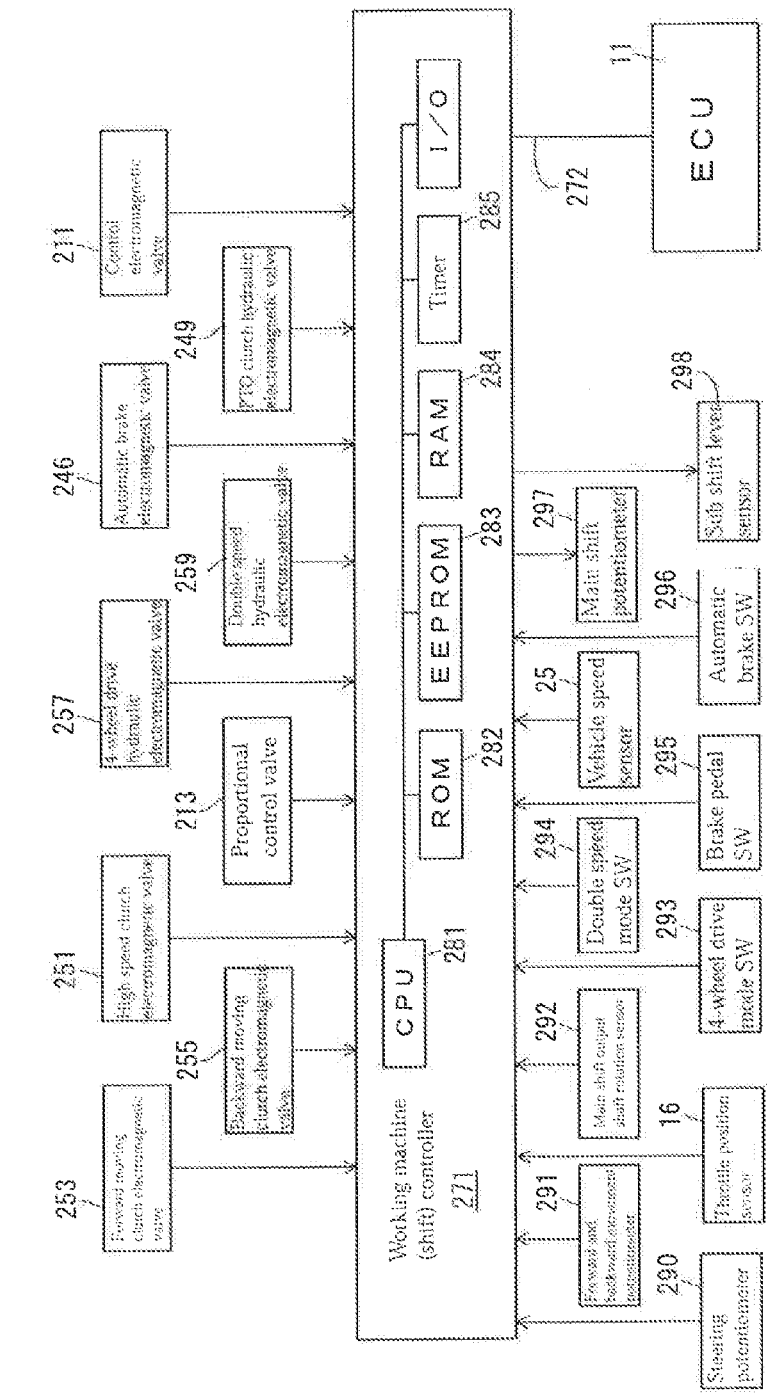
FIG. 8 is a function block diagram showing a relationship between an ECU and a shift controller.

Next, a description will be given of a structure which is relevant to a control of the engine 70 with reference to FIGS. 7 and 8. As shown in FIGS. 7 and 8, the tractor 141 is provided with an ECU 11 which actuates the fuel injection valve 119 of each of the cylinders in the engine 70, and a working machine (shift) controller 271, as control means. The ECU 11 has a CPU 31 which executes various computing processes and controls, a ROM 32 in which various data is previously stored fixedly, an EEPROM 33 which stores control programs and various data in a rewritable manner, a RAM 34 which temporarily stores the control programs and the various data, a timer 35 for measuring time, and an input and output interface. The working machine controller 271 also has a CPU 281, a ROM 282, an EEPROM 283, a RAM 284, a timer 285, and an input and output interface in the same manner as the ECU 11.

The ECU 11 and the working machine controller 271 corresponding to the control means are combined such that a length of harnesses of the input and output system devices becomes as short as possible so as to control the input and output system devices as a target, and are stored in a controller box (not shown) at respective arranged positions. The ECU 11 and the working machine controller 271 are electrically connected to each other via a CAN communication bus 272. The ECU 11 of the embodiment is arranged in the engine 70 or in the vicinity of the engine 70 (refer to FIG. 2). The working machine controller 271 is arranged, for example, below the control seat 148 within the cabin 147 (refer to FIG. 2). In this case, the control means may be structured such that three or more means are connected via the communication bus. Each of the input and output system devices mentioned below may be connected to any control means.

To the input side of the ECU 11, there are connected at least a rail pressure sensor 12 detecting the pressure of the fuel within the common rail 120, an electromagnetic clutch 13 turning or stopping the fuel pump 116, an engine speed sensor 14 detecting the rotating speed of the engine 70 (a cam shaft position of the engine output shaft 74) and serving as rotating speed detecting means, an injection setter 15 detecting and setting a fuel injection frequency (a number of times during one stroke of fuel injection period) of the injector 115, an intake air temperature sensor 17 detecting an intake gas temperature of the intake air system, an exhaust gas temperature sensor 18 detecting an exhaust gas temperature of the exhaust system, a cooling water temperature sensor 19 detecting a temperature of a cooling water of the engine 70, a fuel temperature sensor 20 detecting a temperature of the fuel within the common rail 120, and the DPF differential pressure sensor 68 (the upstream side exhaust gas pressure sensor 68a and the downstream side exhaust gas pressure sensor 68h).

Each of electromagnetic solenoids of respective fuel injection valves 119 for four cylinders of the engine is connected to an output side of the ECU 11. In other words, the high-pressure fuel stored in the common rail 120 is injected from the fuel injection valves 119 at a plurality of times in one stroke while controlling the fuel injection pressure, the injection timing, and the injection period, thereby executing a complete combustion in which generation of the nitrogen oxide (NOx) is suppressed and generation of soot and carbon dioxide is reduced, and improving a fuel consumption. Further, to the output side of the ECU 11, there are connected the intake air throttle device 81 for regulating a pressure of intake air (an amount of intake air) of the engine 70, the exhaust gas throttle device 82 for regulating a pressure of exhaust gas of the engine 70, an ECU failure lamp 22 warning and informing a failure of the ECU 11, an exhaust gas temperature warning lamp 23 informing an abnormally high temperature of the exhaust gas within the DPF 50, and a renewal lamp 24 turning on in connection with a renewing motion of the DPF 50.

As shown in FIG. 8, various electromagnetic valves which are relevant to the output are connected to the working machine controller 271. Namely, there are connected the forward moving dutch electromagnetic valve 253 in relation to the forward moving hydraulic clutch 252, the backward moving clutch electromagnetic valve 255 in relation to the backward moving hydraulic clutch 254, the high speed clutch electromagnetic valve 251 in relation to the sub shift hydraulic cylinder 250, the proportional control valve 213 actuating the main shift hydraulic cylinder 243 in proportion to the amount of operation of the main shift lever 201, the 4-wheel drive hydraulic electromagnetic valve 257 in relation to the 4-wheel drive hydraulic clutch 256, the double speed hydraulic electromagnetic valve 259 in relation to the double speed hydraulic clutch 258, the right and left automatic brake electromagnetic valves 246, the PTO clutch hydraulic electromagnetic valve 249 in relation to the PTO clutch 248, and the control electromagnetic valve 211 supplying the working fluid to the elevation control hydraulic cylinder 215 of the working machine elevating mechanism 160.

Further, various sensors and switches which are relevant to the input are connected to the working machine controller 271. Namely, there are connected a steering potentiometer 290 detecting an amount of turning operation (a steering angle) of the steering wheel 149, a forward and backward movement potentiometer 291 detecting an on-off state of the forward moving and backward moving hydraulic clutches 252 and 254 on the basis of a position of operation of the forward and backward movement switching lever 198, a main shift output shaft rotation sensor 292 detecting an output rotating speed of the main shift output shaft 237, a throttle position sensor 16 detecting a position of operation of the throttle lever 197, a vehicle speed sensor 25 detecting a rotating speed (a vehicle speed) of four front and rear wheels 143 and 144, a 4-wheel drive mode switch 293 operating so as to switch the 4-wheel drive hydraulic electromagnetic valve 257, a double speed mode switch 294 operating so as to switch the double speed hydraulic electromagnetic valve 259, a brake pedal switch 295 detecting whether the brake pedal 191 is depressed, an automatic brake switch 296 operating so as to switch the automatic brake electromagnetic valve 246, a main shift potentiometer 297 detecting an operating position of the main shift lever 201, and a sub shift lever sensor 298 detecting an operating position of the sub shift lever 195.

An output characteristic map M (refer to FIG. 10) indicating a relationship between a rotating speed N and a torque T (load) of the engine 70 is previously stored in the EEPROM 33 of the ECU 11 or the EEPROM 283 of the working machine controller 271. The output characteristic map M is determined by experiments or the like. In the output characteristic map M shown in FIG. 10, the rotating speed N is set to a horizontal axis, and the torque T is set to a vertical axis. The output characteristic map M is a region surrounded by a solid line Tmx which is drawn convex upward. The solid line Tmx is a maximum torque line expressing a maximum torque in relation to each of the rotating speeds N.

Figure 10:
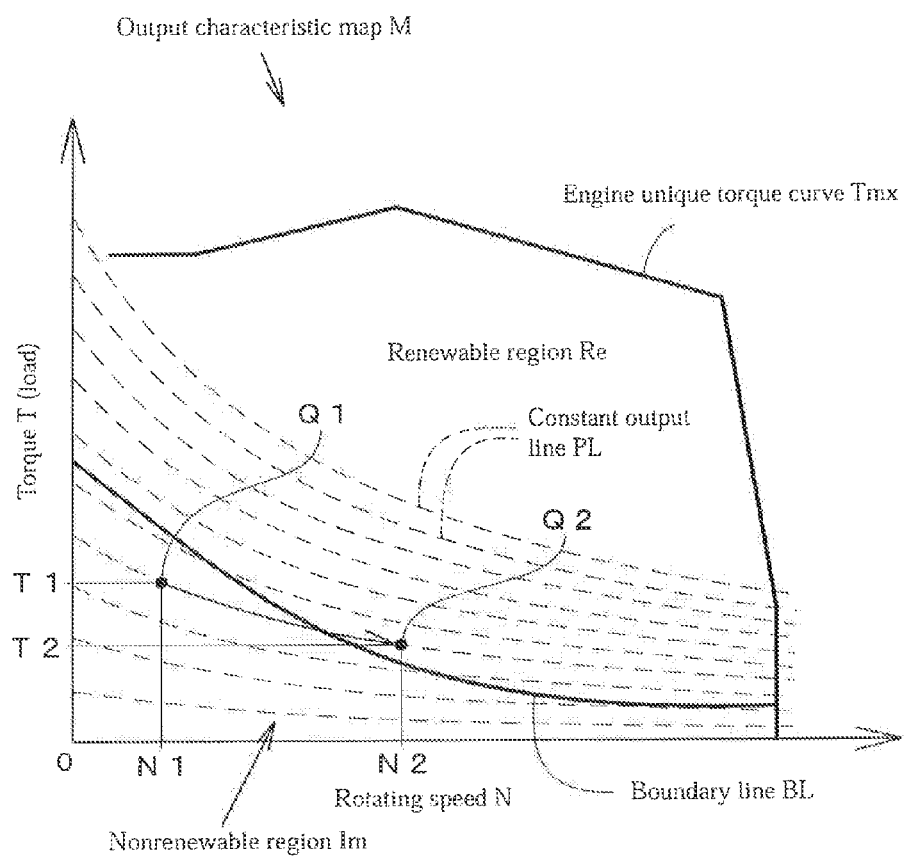
FIG. 10 is an explanatory view of an output characteristic map.

The output characteristic map M shown in FIG. 10 is segmentalized into upper and lower sections by a boundary line BL expressing a relationship between the rotating speed N and the torque T in the case that the temperature of the exhaust gas is a renewal boundary temperature (about 30° C.). An upper region with respect to the boundary line BL is a renewable region Re which can oxidize and remove the PM deposited in the soot filter 54, and a lower region is a nonrenewable region Im in which the PM is deposited in the soot filter 54 without being oxidized and removed. Further, a series of constant output lines PL are described in the output characteristic map M. The constant output line Pb is a line indicating a relationship between the rotating speed N and the torque T in the case that an output horsepower of the engine 70 is fixed. Since a product of the rotating speed N and the torque T is in a proportional relationship to the output horsepower, the constant output line PL is expressed as an inverse proportion line in the output characteristic map M in FIG. 10.

The ECU 11 is structured such as to determine the torque T of the engine 70 on the basis of the rotating speed detected by the engine speed sensor 14 and the throttle position detected by the throttle position sensor 16, compute a target fuel injection amount by using the torque T and the output characteristic map M, and execute a fuel injection control for actuating the common rail device 117 on the basis of the result of computation. In this case, the fuel injection amount of the common rail device 117 is regulated by regulating a valve opening period of each of the fuel injection valves 119 and changing the injection period of each of the injectors 115.

(6) Aspect of DPF Renewing Control

Next, a description will be given of an example of the renewing control of the DPF 50 by the ECU 11 with reference to flow charts in FIGS. 11 and 12. The control mode (the control type relating to the renewal of the DPF so) of the engine 70 includes at least a normal operation mode of carrying out a road traveling and various works, and a renewal priority mode of raising the temperature of the exhaust gas when the clogging state of the DPF 50 becomes equal to or more than a prescribed level. In the renewal priority mode, the temperature of the exhaust gas in the DPF 50 is raised (about 560° C.) by closing the intake air throttle device 81 or the exhaust gas throttle device 82 to a predetermined opening degree on the basis of the detected information of the differential pressure sensor 68 so as to restrict the amount of the intake air and the amount of the exhaust gas, or burning the unburned fuel supplied into the DPF 50 on the basis of the post injection F by the diesel oxidation catalyst 53. As a result, the PM in the DPF 50 (the soot filter 54) is forcedly burned and removed.

As is known from the description of the renewal priority mode, for example, the engine 70, the intake air throttle device 81, the exhaust gas throttle device 82, and the common rail device 117 are members related with the renewing motion of the DPF 50. These devices 70, 81, 82, and 117 construct the renewing device which burns and removes the PM in the DPF 50.

The normal operation mode and the renewal priority mode are executed on the basis of the command of the ECU 11. Namely, an algorithm shown by flow charts in FIGS. 11 and 12 is stored in the EEPROM 33, and each of the modes is executed by calling the algorithm to the RAM 34 and processing the algorithm by the CPU 31.

Figure 11:
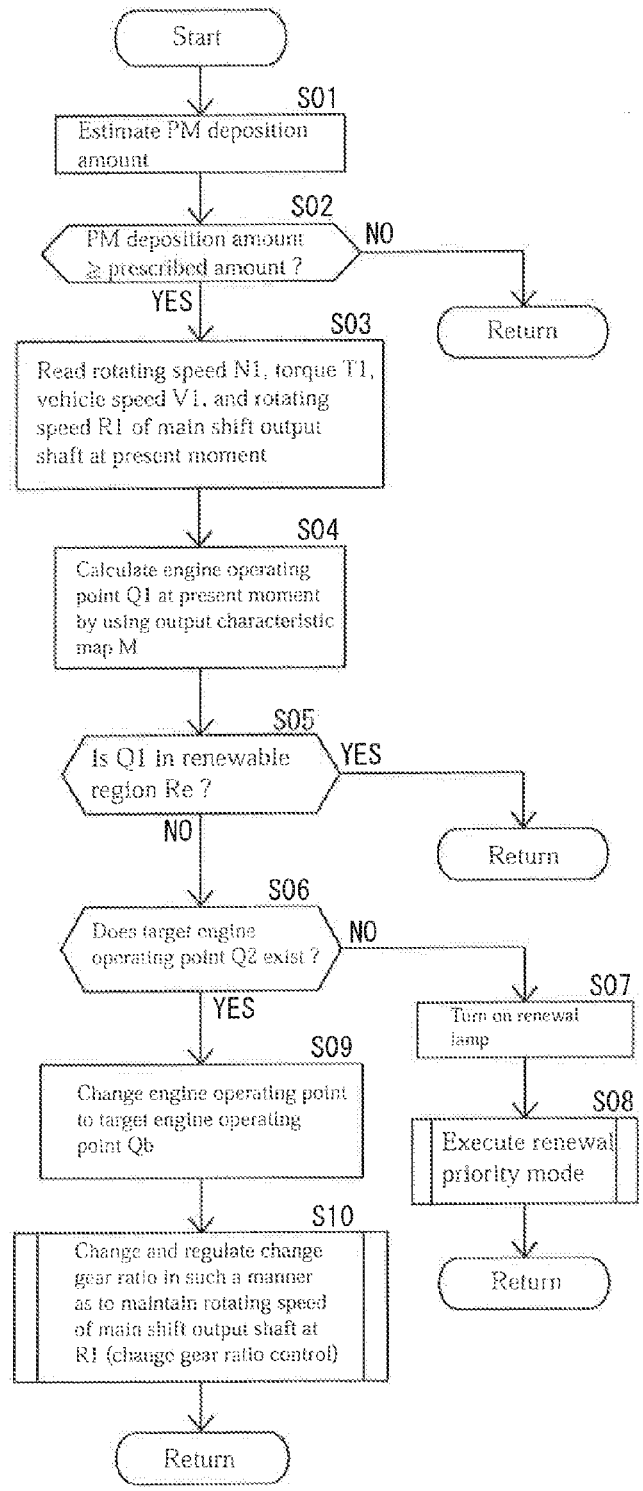
FIG. 11 is a flow chart showing a flow of a DPF renewing control.

As shown by the flow chart in FIG. 11, in the renewing control of the DPF 50, first of all, the deposition amount of the PM in the DPF 50 is estimated on the basis of a result of detection of the differential pressure sensor 68 (S01), and it is determined whether the estimated result is equal to or more than a prescribed amount (a prescribed level) (S02). The detection by the differential pressure sensor 68 is carried out per an appropriate time. In the case it is determined that the deposition amount of the PM is less than the prescribed amount (S02: NO), the process returns and the normal operation mode proceeds. In the case it is determined that the deposition amount of the PM is equal to or more than the prescribed amount (S02: YES), the rotating speed N1 and the torque T1 at the present moment in the engine 70, the vehicle speed V1 at the present moment, and the rotating speed R1 of the main shift output shaft 237 are read (S03), the engine operating point Q1 at the present moment is determined by using the rotating speed N1 and the torque T1 at the present moment and the output characteristic map M (S04), and it is determined whether or not the engine operating point Q1 at the present moment is in the renewable region Re (S05). If the engine operating point Q1 at the present moment is in the renewable region Re (S05: YES), the temperature of the exhaust gas is higher than the renewal boundary temperature, and the PM deposited in the DPF 50 (the soot filter 54) can be oxidized and removed (self-renewed). Therefore, the process returns and the normal operation mode proceeds.

If the engine operating point Q1 at the present moment is in the nonrenewable region Im (S05: NO), the DPF 50 cannot be self-renewed. Accordingly, it is next determined whether or not there exists a target engine operating point Q2 in a high-speed and low-torque side in which the output horsepower is the same as that at the engine operating point Q1 at the present moment and the DPF 50 can be self-renewed, on the basis of the relationship between the engine operating point Q1 at the present moment, and the constant output line PL and the boundary line BL of the output characteristic map M (S06). Since the output horsepower at the engine operating point Q1 at the present moment is the same as that of the target engine operating point Q2, the engine operating point Q1 at the present moment and the target engine operating point Q2 are positioned on the common constant output line PL.

In the case that the target engine operating point Q2 does not exist (S06: NO), the renewal lamp 24 is turned on (S07), and thereafter the renewal priority mode is executed (S08). In the renewal priority mode, the load of the engine 70 is increased by limiting the amounts of the intake air or the exhaust gas by using the intake air throttle device 81 or the exhaust gas throttle device 82, as mentioned above. In connection with this, the output horsepower is increased for maintaining the set rotating speed by the throttle lever 197, and the temperature of the exhaust gas from the engine 70 rises. Further, the temperature of the exhaust gas in the DPF 50 is raised by burning the unburned fuel supplied into the DPF 50 by the post injection E of the common rail 120 by the diesel oxidation catalyst 53. As a result, the PM in the DPF 50 is burned and removed, and the PM collecting capacity of the DPF 50 is recovered. The renewal priority mode according to the embodiment is executed, for example, for about several tens minutes, the opening degrees of the intake air throttle device 81 and the exhaust gas throttle device 82 are returned to the original states before narrowing them after elapse of the time, and the common rail 120 does not carry out the post injection E. Thereafter, the process returns and the normal operating mode is executed.

In the case that the target engine operating point Q2 exists (S06: YES), the engine operating point is changed to the target engine operating point Q2 from the point Q1 at the present moment by regulating the fuel injection amount of the common rail device 117 in such a manner that the torque T is lowered (T1→T2) in accordance with the speeding up (N1→N2) of the rotating speed N of the engine 70 (S09). Further, by correcting the applied voltage of the proportional control valve 213 on the basis of the command from the working machine controller 271, the angle of incline of the pump swash plate 242 in the hydraulic pump portion 240 is changed and regulated by actuating the main shift hydraulic cylinder 243, the supply amount of the working fluid to the hydraulic motor portion 241 is controlled, and the change gear ratio of the continuously variable transmission 159 is changed and regulated in such a manner that the rotating speed R of the main shift output shaft 237 is maintained at the detected value R1 in the step S03 (change gear ratio control, 510). In this case, the change gear ratio means a rate (R/N) of the rotating speed R of the main shift output shaft 237 with respect to the rotating speed N of the engine 70.

The engine operating point Q is changed and the rotating speed N of the engine 70 becomes higher by controlling as mentioned above, however, the rotating speed R of the main shift output shaft 237 can be maintained constant by changing and regulating the change gear ratio. Namely, the vehicle speed V of the travel machine body 142 can be kept constant before and after changing the engine operating point Q.

Figure 12:
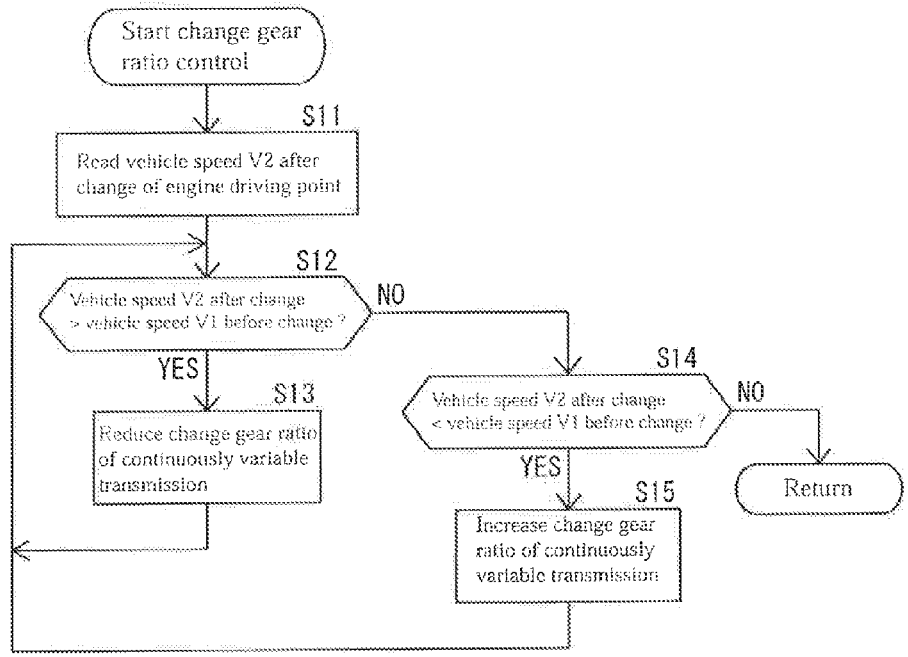
FIG. 12 is a flow chart showing details of a change gear ratio control.

The change gear ratio control in the step S10 is executed, for example, as shown by the flow chart in FIG. 12. Namely, a vehicle speed V2 after changing to the engine operating point Q2 is read (S11), in the case that the vehicle speed V2 after changing is higher than the vehicle speed V1 before changing which is read in the step S03 (S12: YES,) the change gear ratio of the continuously variable transmission 159 is reduced in such a manner that the rotating speed R of the main shift output shaft 237 comes to the detected value in the step S03 (S13), and the process returns to the step S12. In the case that the vehicle speed. V2 after changing is lower than the vehicle speed V1 before changing (S14: YES), the change gear ratio of the continuously variable transmission 159 is increased in such a manner that the rotating speed R of the main shift output shaft 237 comes to the detected value R1 in the step S03 (S15), and the process returns to the step S12. If the vehicle speed V1 before changing is equal to the vehicle speed V2 after changing (S14: NO), the process returns so as the mode to return to the normal operating mode.

As is known from the description mentioned above, in the working vehicle 141 provided with the engine 70 which is mounted to the travel machine body 142, the common rail type fuel injection device 117 which injects the fuel to the engine 70, the continuously variable transmission 159 which shifts the power from the engine 70, and the exhaust gas purification device 50 which is arranged in the exhaust system of the engine 70, since in the case that the engine operating point Q relating to the rotating speed N and the torque T of the engine 70 is in the low-speed and low-torque side incapable of self-renewing the exhaust gas purification device 50, the engine operating point Q is changed to the high-speed and low-torque side capable of self-renewing the exhaust gas purification device 50, and the change gear ratio of the continuously variable transmission 159 is changed and regulated in such a manner that the vehicle speed. V of the travel machine body 142 is not changed, it is possible to clear the clogging of the exhaust gas purification device 50 without executing the forced renewal of the exhaust gas purification device 50, while maintaining the vehicle speed V, for example, under various works while traveling at a low speed. Therefore, it is possible to achieve an effect of improving a workability in the working vehicle 141.

Further, at the engine operating point Q2 in the high-speed and low-torque side, since the self-renewal of the exhaust gas purification device 50 is allowed, under the condition that the output horsepower is equal to that at the engine operating point Q1 in the low-speed and low-torque side, the output horsepower of the engine 70 is used as a reference for changing the engine operating point Q. Therefore, it is possible to easily and accurately maintain the vehicle speed V of the working vehicle 141.

Further, since the renewing devices 70, 81, 82, and 117 for burning and removing the particulate matter in the exhaust gas purification device 50 is provided, and in the case that the engine operating point Q1 is in the low-speed and low-torque side incapable of self-renewing the exhaust gas purification device 50 the renewing devices 70, 81, 82, and 117 are actuated when the output horsepower is equal to that at the engine operating point Q1 in the low-speed and low-torque side, and the engine operating point Q2 in the high-speed and low-torque side capable of self-renewing the exhaust gas purification device 50 does not exist, the exhaust gas purification device 50 can be renewed by directly regulating the output horsepower of the engine 70 or actuating the renewing devices 70, 81, 82, and 117 depending on the situation. Therefore, it is possible to reduce the operating frequency or shorten the operating time of the renewing devices 70, 81, 82, and 117, thereby achieving the efficient renewal of the exhaust gas purification device 50, and it is possible to achieve an effect of contributing to suppression of deterioration of fuel consumption.

(7) Others

The present invention is not limited to the embodiment mentioned above, but can be embodies into various aspects. The structure of each of the portions is not limited to the illustrated embodiment, but can be variously modified within a range which does not deflect from the scope of the present invention. For example, in place of detection of the rotating speed R of the main shift output shaft 237, the vehicle speed V (the rotating speed of the front and rear wheels 143 and 144) may be detected, and the change gear ratio control may be carried out on the basis of the vehicle speed V. This structure may be employed as an equivalent significant. Further, the continuously variable transmission 159 is not limited to the inline type mentioned above, but can employ various types such as a mechanical type including a belt type and a ring cone, a hydrostatic transmission, a hydromechanical transmission and the like.

REFERENCE SIGNS LIST

11 ECU (control means)
50 DPF (exhaust gas purification device)
70 Engine
81 Intake air throttle device
82 Exhaust gas throttle device
117 Common rail device
120 Common rail
141 Tractor (working vehicle)
142 Travel machine body
164 Rotary tiller (ground working machine)
200 Seeding machine

The invention claimed is:

1. A drive system control device of a working vehicle, the working vehicle comprising:
   an engine which is mounted to a travel machine body;
   a fuel injection device which injects fuel to the engine;
   a continuously variable transmission which shifts power from the engine; and
   an exhaust gas purification device which is arranged in an exhaust system of the engine, where there is provided a renewing device for burning off the particulate matter in the exhaust gas purification device;
   wherein when an engine operating point relating to a rotating speed and a torque of the engine is in a low-speed and low-torque side incapable of self-renewing the exhaust gas purification device, the engine operating point of the low speed and low-torque side and the output horsepower are equal, and there is no engine operating point of a high-speed and low-torque side capable of self-renewing the exhaust gas purification device, then the renewing device is actuated so as to forcibly increase the exhaust gas temperature of the engine; and
   wherein when the engine operating point of the low-speed and low-torque side and the output horsepower are equal, and there is an engine operating point of a high-speed and low-torque side capable of self-renewing the exhaust gas purification device, then the engine operating point is changed from the low-speed and low-torque side to a high-speed and low-torque side, and a change gear ratio of the continuously variable transmission is changed and regulated in such a manner that a vehicle speed of the travel machine body is not changed and the renewing device is not actuated.

* * * * *